US010473370B2

(12) United States Patent
Bozeman et al.

(10) Patent No.: US 10,473,370 B2
(45) Date of Patent: Nov. 12, 2019

(54) EJECTOR-RECEIVER REFRIGERATION CIRCUIT WITH VALVE

(71) Applicant: GM Global Technology Operations LLC, Detroit, MI (US)

(72) Inventors: Jeffrey A. Bozeman, Rochester, MI (US); Dana L. Anderson, Sterling Heights, MI (US); James Resutek, Romeo, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 49 days.

(21) Appl. No.: 15/839,202

(22) Filed: Dec. 12, 2017

(65) Prior Publication Data

US 2019/0178541 A1 Jun. 13, 2019

(51) Int. Cl.

*F25B 41/00* (2006.01)
*F25B 5/02* (2006.01)
*F25B 5/04* (2006.01)
*F25B 39/02* (2006.01)

(52) U.S. Cl.

CPC ............. *F25B 41/003* (2013.01); *F25B 5/02* (2013.01); *F25B 5/04* (2013.01); *F25B 39/02* (2013.01)

(58) Field of Classification Search

CPC .. F25B 41/003; F25B 9/10; F25B 5/02; F25B 5/04; F25B 9/02; F25B 9/08; F25B 2339/044; F25B 2341/0012; F25B 2400/23; F25B 2500/18; F25B 40/00; B60H 2001/3298; B60H 1/3227; B60H 1/3223

See application file for complete search history.

(56) References Cited

U.S. PATENT DOCUMENTS

| | | | | | |
|---|---|---|---|---|---|
| RE30,285 | E * | 5/1980 | Babington | A61M 11/06 | 239/337 |
| 5,490,397 | A * | 2/1996 | Kitamura | F25B 41/062 | 62/474 |
| 5,553,457 | A * | 9/1996 | Reznikov | F25B 5/04 | 62/198 |
| 6,579,351 | B2 * | 6/2003 | Fisk | B01D 46/0005 | 210/282 |
| 7,569,095 | B2 * | 8/2009 | Vanderstraeten | B01D 53/261 | 95/107 |
| 7,832,229 | B2 * | 11/2010 | Nakamura | F25B 5/04 | 62/498 |
| 8,201,415 | B2 * | 6/2012 | Nakamura | F25B 41/00 | 62/170 |

(Continued)

*Primary Examiner* — Kun Kai Ma

(57) ABSTRACT

An automobile vehicle refrigeration system combined ejector-receiver includes a container. An internal heat exchanger (IHX) is positioned entirely within the container. The IHX includes a canister. A receiver and dryer is located entirely within the container and is positioned at least partially within the canister defining a cavity between the receiver and dryer and the canister to receive a refrigerant. An ejector is positioned within the container. An ejector feed line is in communication with the cavity between the receiver and dryer and the canister, the ejector feed line receiving the refrigerant after discharge from the cavity for flow into the ejector. A refrigerant phase separator is positioned within the container. The refrigerant phase separator receives the refrigerant after discharge from the ejector for separation into each of a refrigerant gas and a refrigerant liquid.

17 Claims, 3 Drawing Sheets

(56) References Cited

U.S. PATENT DOCUMENTS

| | | | | |
|---|---|---|---|---|
| 8,216,335 | B2 * | 7/2012 | Scott | B01D 46/0005 55/498 |
| 8,534,093 | B2 * | 9/2013 | Sugiura | F25B 5/02 285/120.1 |
| 2004/0031596 | A1 * | 2/2004 | Nishida | B60H 1/3227 165/140 |
| 2004/0134171 | A1 * | 7/2004 | Scott | B01D 46/0001 55/482 |
| 2005/0188717 | A1 * | 9/2005 | Aikawa | F25B 41/00 62/434 |
| 2006/0130661 | A1 * | 6/2006 | Dean | B01D 19/0057 96/208 |
| 2006/0254308 | A1 * | 11/2006 | Yokoyama | B60H 1/3205 62/500 |
| 2007/0000262 | A1 * | 1/2007 | Ikegami | F25B 31/002 62/170 |
| 2007/0119207 | A1 * | 5/2007 | Oshitani | F25B 5/00 62/500 |
| 2007/0261433 | A1 * | 11/2007 | Mikita | F25B 40/00 62/512 |
| 2008/0098757 | A1 * | 5/2008 | Takeuchi | F25B 41/00 62/217 |
| 2008/0202121 | A1 * | 8/2008 | Nagel | F01K 21/04 60/670 |
| 2010/0162751 | A1 * | 7/2010 | Nishijima | F25B 1/10 62/500 |
| 2010/0199716 | A1 * | 8/2010 | Murakami | F25B 43/00 62/512 |
| 2011/0005268 | A1 * | 1/2011 | Oshitani | F25B 41/00 62/500 |
| 2011/0120182 | A1 * | 5/2011 | Haussmann | F25B 39/022 62/524 |
| 2012/0151948 | A1 * | 6/2012 | Ogata | F04C 18/3564 62/157 |
| 2017/0211850 | A1 * | 7/2017 | Fukushima | F25B 43/00 |
| 2018/0291911 | A1 * | 10/2018 | Ward | F04B 17/03 |
| 2018/0361068 | A1 * | 12/2018 | Fabricius | A61M 5/20 |
| 2018/0369483 | A1 * | 12/2018 | Olesen | A61M 5/20 |
| 2019/0178541 | A1 * | 6/2019 | Bozeman | F25B 5/02 |

* cited by examiner

EJECTOR-RECEIVER REFRIGERATION CIRCUIT WITH VALVE

INTRODUCTION

The present disclosure relates to air conditioning circuits for automobile vehicles.

Air conditioning circuits for automobile vehicles commonly provide distinct components for each of a condenser, a phase separator, a compressor, an evaporator, and an ejector if present. Ejectors may provide a more efficient operation than traditional systems lacking an ejector, but are not widely used. The piping and arrangement constraints to connect the multiple components and a compressor, and for controlling flow, require complex arrangements that are not easily configured in the engine compartment. Known air conditioning ejector systems include one or more evaporators together with the ejector in a single combined unit, however, system piping and arrangement complexities remain as issues.

Thus, while current air conditioning circuits for automobile vehicles achieve their intended purpose, there is a need for a more efficient and improved system and method for housing components and arranging air conditioning circuits for automobile vehicles.

SUMMARY

According to several aspects, an automobile vehicle refrigeration system may combine an ejector, a valve, a dryer, and a receiver inside a container, together defining an ejector-receiver. An internal heat exchanger (IHX) device is positioned within the container. The IHX device (FIG. 4) or a distinct container (FIG. 3) includes a phase separation function. A receiver and dryer is located within the container and is positioned at least partially within the IHX device. An ejector is also positioned within the container.

In another aspect of the present disclosure, an inner wall of the IHX device and an outer wall of the receiver and dryer are positioned within the device defining a heat exchange cavity, the heat exchange cavity receiving the refrigerant as a refrigerant gas fed from an evaporator (FIG. 3) positioned external to the ejector-receiver via a liquid-gas inlet line extending into the ejector-receiver, or from an external ejector exit.

In another aspect of the present disclosure, an ejector feed line is positioned in the container providing communication for flow of the refrigerant between the cavity of the IHX device and an inlet of the ejector.

In another aspect of the present disclosure, a bypass line contains a throttling valve in communication with the ejector feed line and the ejector allowing a portion of a refrigerant liquid in the ejector feed line to cause a swirl in the inlet of the ejector.

In another aspect of the present disclosure, a refrigerant phase separator function is positioned within the container in communication with the ejector and receiving the refrigerant discharged from the ejector for separation into each of a refrigerant gas and a refrigerant liquid.

In another aspect of the present disclosure, the refrigerant phase separator includes: a gas outlet line in communication with an inlet of a compressor positioned external to the container to transfer the refrigerant gas to the compressor; and a liquid discharge line transferring the refrigerant liquid to an evaporator positioned external to the container, the liquid discharge line having a throttling valve positioned within the container.

In another aspect of the present disclosure, a condenser outlet line directs flow of the refrigerant from a phase separation condenser positioned external to the container, to flow into the receiver and dryer. A receiver and dryer line positioned within the container is in communication between the condenser and an ejector inlet.

In another aspect of the present disclosure, a refrigerant phase separator is positioned within the canister of the heat exchanger, the refrigerant phase separator receiving refrigerant discharged from the ejector.

In another aspect of the present disclosure, a discharge line is in communication with the ejector directing a discharge from the ejector into the IHX device. A liquid discharge line is in communication with the IHX device directing the refrigerant in liquid phase discharged from the heat exchanger canister into an evaporator positioned external to the container, the liquid discharge line having a throttling valve positioned in the IHX device.

In another aspect of the present disclosure, a gas outlet line extending from the IHX device directs refrigerant in a gas phase into an inlet of a compressor positioned external to the container. A condenser return line directs flow of the refrigerant from a phase separation condenser positioned external to the container into the receiver and dryer integrated heat exchanger.

According to several aspects, an automobile vehicle refrigeration system combined ejector valve and receiver includes a container. A heat exchanger device is positioned within the container. A receiver and dryer is located entirely within the container and is positioned at least partially within the heat exchanger device defining a cavity between the receiver and dryer and the heat exchanger device to receive a refrigerant. An ejector is positioned within the container in communication with the heat exchanger device, the ejector receiving the refrigerant after discharge from the cavity. A refrigerant phase separator is positioned within the container used to separate the refrigerant into each of a gas and a liquid.

In another aspect of the present disclosure, a cold gas inlet line is connected to the container, wherein the refrigerant as the gas is fed from an evaporator positioned external to the container into the cold gas inlet line.

In another aspect of the present disclosure, the refrigerant phase separator is in communication with the ejector, the refrigerant phase separator receiving the refrigerant after discharge from the ejector.

In another aspect of the present disclosure, an ejector aspirated inlet line connects the cavity to the ejector, the ejector aspirated inlet line receiving the refrigerant after discharge from the cavity for flow into the ejector.

In another aspect of the present disclosure, a bypass line containing a throttling valve is in communication with the ejector feed line and the ejector allowing a portion of the refrigerant in the ejector feed line to bypass an inlet of the ejector.

In another aspect of the present disclosure, the refrigerant phase separator is positioned entirely within the heat exchanger device.

In another aspect of the present disclosure, a discharge line is in communication with the ejector directing a discharge of the refrigerant from the ejector into the heat exchanger device for flow into the refrigerant phase separator.

According to several aspects, an automobile vehicle refrigeration system combined ejector-receiver includes a container. An internal heat exchanger (IHX) is positioned entirely within the container. The IHX includes a canister. A receiver and dryer is located entirely within the container and is positioned at least partially within the canister defining a cavity between the receiver and dryer and the canister to receive a refrigerant. An ejector is positioned within the container. An ejector feed line is in communication with the IHX, the ejector feed line receiving the refrigerant after discharge from the receiver and dryer for flow into the ejector. A refrigerant phase separator function is positioned within the container. The refrigerant phase separator receives the refrigerant after discharge from the ejector for separation into each of a refrigerant gas and a refrigerant liquid.

In another aspect of the present disclosure, a refrigerant gas outlet line is in communication with the refrigerant phase separator to transfer the refrigerant gas outside of the container. A refrigerant liquid discharge line is in communication with the refrigerant phase separator to transfer the refrigerant liquid outside of the container, the refrigerant liquid discharge line having a throttling valve positioned within the container.

In another aspect of the present disclosure, a liquid refrigerant discharge line is included for transferring the liquid refrigerant out of the container, the liquid refrigerant discharge line having an electronically regulated throttling valve positioned within the container.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figures 1, 2:
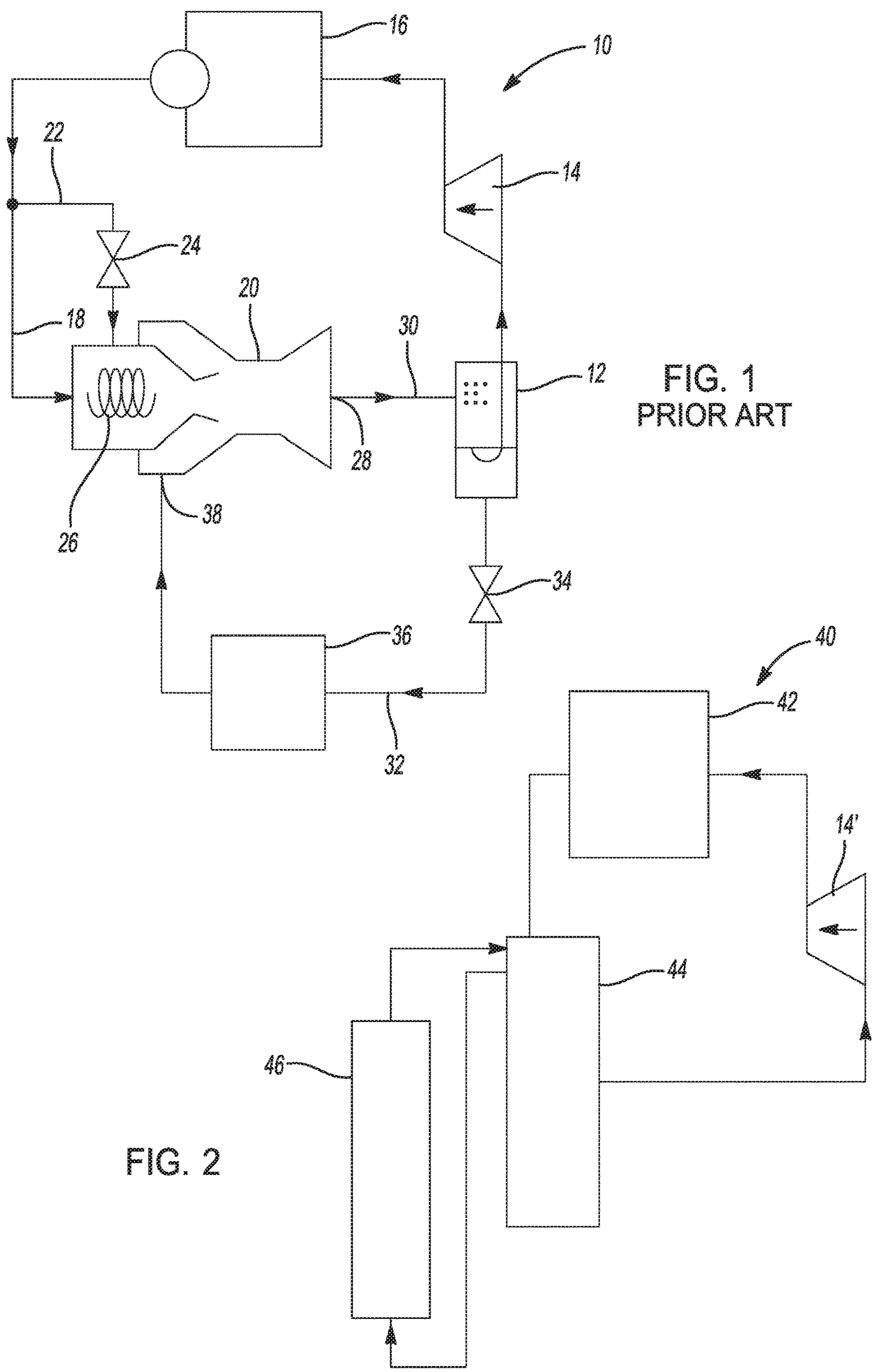
FIG. 1 is a diagram of a conventional refrigeration system for a motor vehicle.
FIG. 2 is a diagram of a refrigeration system according to an exemplary embodiment.

Referring to FIG. 1, a conventional refrigeration system 10 for a motor vehicle (not shown) includes a separator 12 which provides refrigerant gas to the suction side of a compressor 14. Discharge from the compressor 14 is then cooled in a condenser 16. An output of the condenser 16 is fed via a feed line 18 into an ejector 20. A portion of the discharge from the condenser 16 can also be bypassed in a bypass line 22 through a vortex control or throttling valve 24 to create a swirl flow 26 in the ejector 20. An output 28 of the ejector 20 is connected via a return line 30 to the separator 12. Refrigerant in liquid phase is discharged from the separator 12 and retained in liquid phase by reducing a flow rate and maintaining pressure using a metering or throttling valve 34 for introduction into an evaporator 36. A gas phase of the refrigerant discharged from the evaporator 36 is then fed into an aspirated inlet line 38 of the ejector 20 downstream of the location of an ejector chamber providing space for the swirl flow 26.

Referring to FIG. 2 and again to FIG. 1, a refrigeration system 40 is modified from the refrigeration system 10 and provides a phase separation condenser 42 receiving refrigerant gas from the compressor 14'. An output of the phase separation condenser 42 is fed into a combined ejector-receiver 44. Refrigerant gas is discharged from the ejector-receiver 44 back to a suction inlet of the compressor 14'. Refrigerant in liquid phase is discharged from the ejector-receiver 44 via connection to an evaporator 46. Multiple functions of the conventional refrigeration system 10 are incorporated into the ejector-receiver 44, thereby reducing system packaging size and enhancing system efficiency. The components and configurations within the ejector-receiver 44 will be described in greater detail in reference to FIGS. 3 and 4.

Referring to FIG. 3 and again to FIG. 2, in a first aspect, components of the ejector-receiver 44 are all incorporated into a single heat exchanger container 48. The container 48 may take any desired geometric form, including cylindrical, rectangular, square, or oval. The container 48 can be connected to structure of a vehicle such as an engine compartment firewall with system connections to the compressor 14', the phase separation condenser 42, and the evaporator 46. Included in the container 48 are an internal heat exchanger (IHX) 49 exchanging heat with a heat exchanger device 50 which houses a receiver and dryer 52. Also included in the heat exchanger container 48 are an ejector 54 and a refrigerant phase separator 56. A refrigerant in the form of a cold gas, for example at approximately 10 degrees Centigrade, is fed from the evaporator 46 shown in FIG. 2 via a cold gas inlet line 58 into the heat exchanger device 50. An inner wall 59 of the heat exchanger device 50 and an outer wall 60 of the receiver and dryer 52 positioned within the heat exchanger device 50 define a device cavity 61.

The cold gas within the heat exchanger device 50 flows through the device cavity 61 and is warmed by contact with the outer wall 60. The outer wall 60 isolates hot high pressure refrigerant liquid in the receiver and dryer 52 received from the phase separation condenser 42 described in reference to FIG. 2 from the cold gas received via the cold gas inlet line 58. The cooled high pressure liquid then flows via an ejector feed line 62 into an inlet line 64 of the ejector 54. A portion of the flow in the ejector feed line 62 can also be bypassed around the inlet line 64 using a bypass line 66 containing a vortex control or throttling valve 68 which induces a swirl flow 70 in a chamber 71 of the ejector 54.

An ejector discharge line 72 communicates refrigerant from the ejector 54 to the phase separator 56. The phase separator 56 receives the refrigerant and separates the refrigerant into each of a gas and a liquid phase. Refrigerant as a gas is discharged from the phase separator 56 via a gas outlet line 74 and is returned to an inlet of the compressor 14' shown in FIG. 2. Refrigerant as a liquid is discharged from the phase separator 56 via a liquid discharge line 76 into the evaporator 46. The refrigerant is retained in liquid phase during transfer by throttling flow using a metering or electronically regulated throttling valve 78 positioned in the liquid discharge line 76. Refrigerant passing through the heat exchanger 49 is directed via an IHX line 80 into an aspirated inlet post 82 into the ejector 54 downstream of the chamber 71 provided for the swirl flow 70.

A condenser outlet line 84 directs flow from the phase separation condenser 42 shown in FIG. 2 into the receiver and dryer 52. In addition to each of the heat exchanger device 50, the receiver and dryer 52, the ejector 54 and the phase separator 56, the container 48 also encloses the ejector feed line 62, the bypass line 66, the throttling valve 68, the ejector discharge line 72, and the IHX line 80. Connections 86, 88, 90, 92 may also be provided through a wall of the container 48 for each of the cold gas inlet line 58, the gas outlet line 74, the liquid discharge line 76 and the condenser outlet line 84. It is noted the throttling valve 68 and the throttling valve 78 are shown and described in several aspects as being positioned within the container 48, however according to further aspects, either the throttling valve 68 or the throttling valve 78, or both valves can be positioned outside of the container 48 of the ejector-receiver 44.

Figure 3:
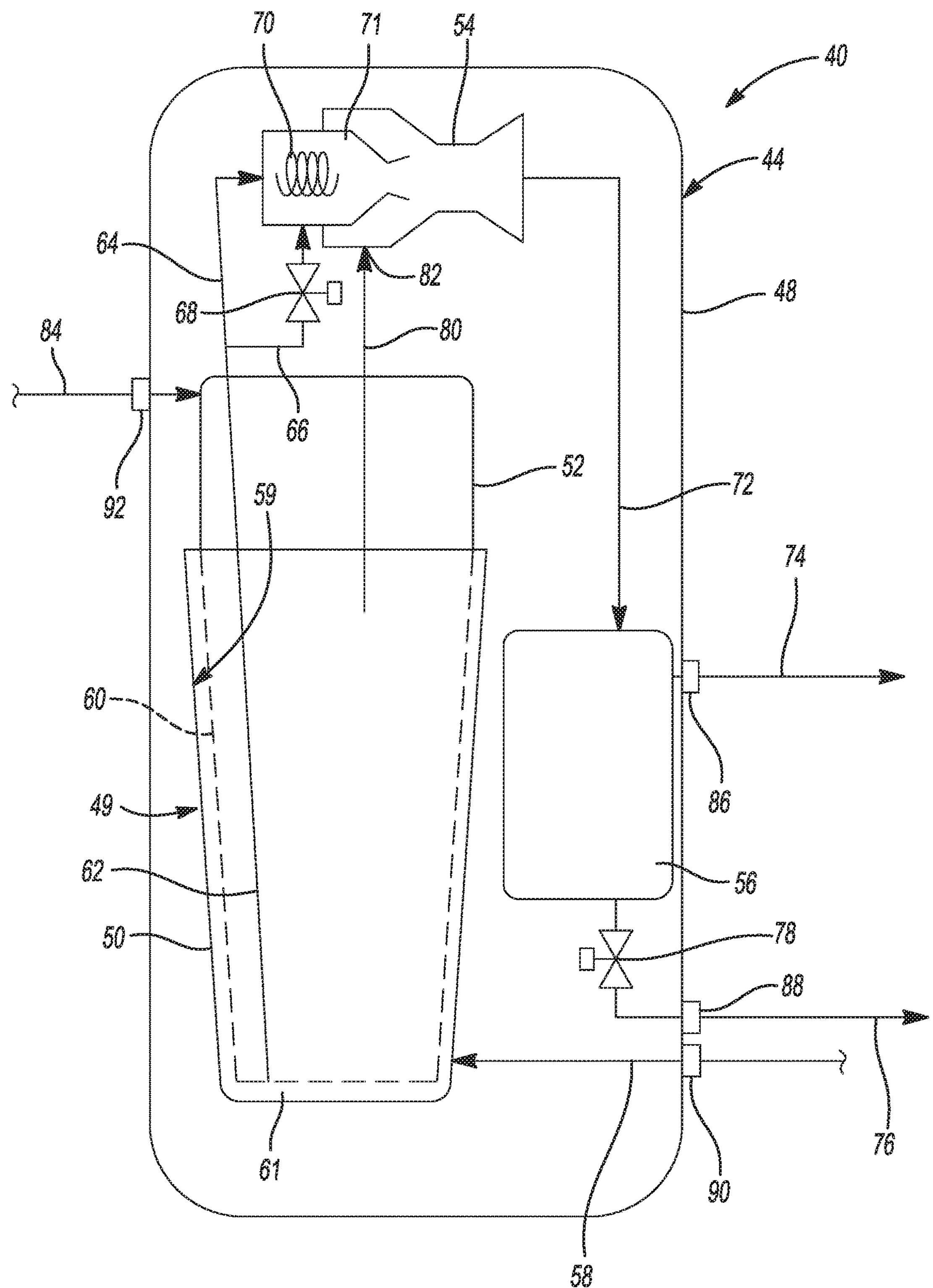
FIG. 3 is a diagrammatic view of an ejector-receiver having components incorporated into a single container according to an exemplary embodiment.
Figure 4:
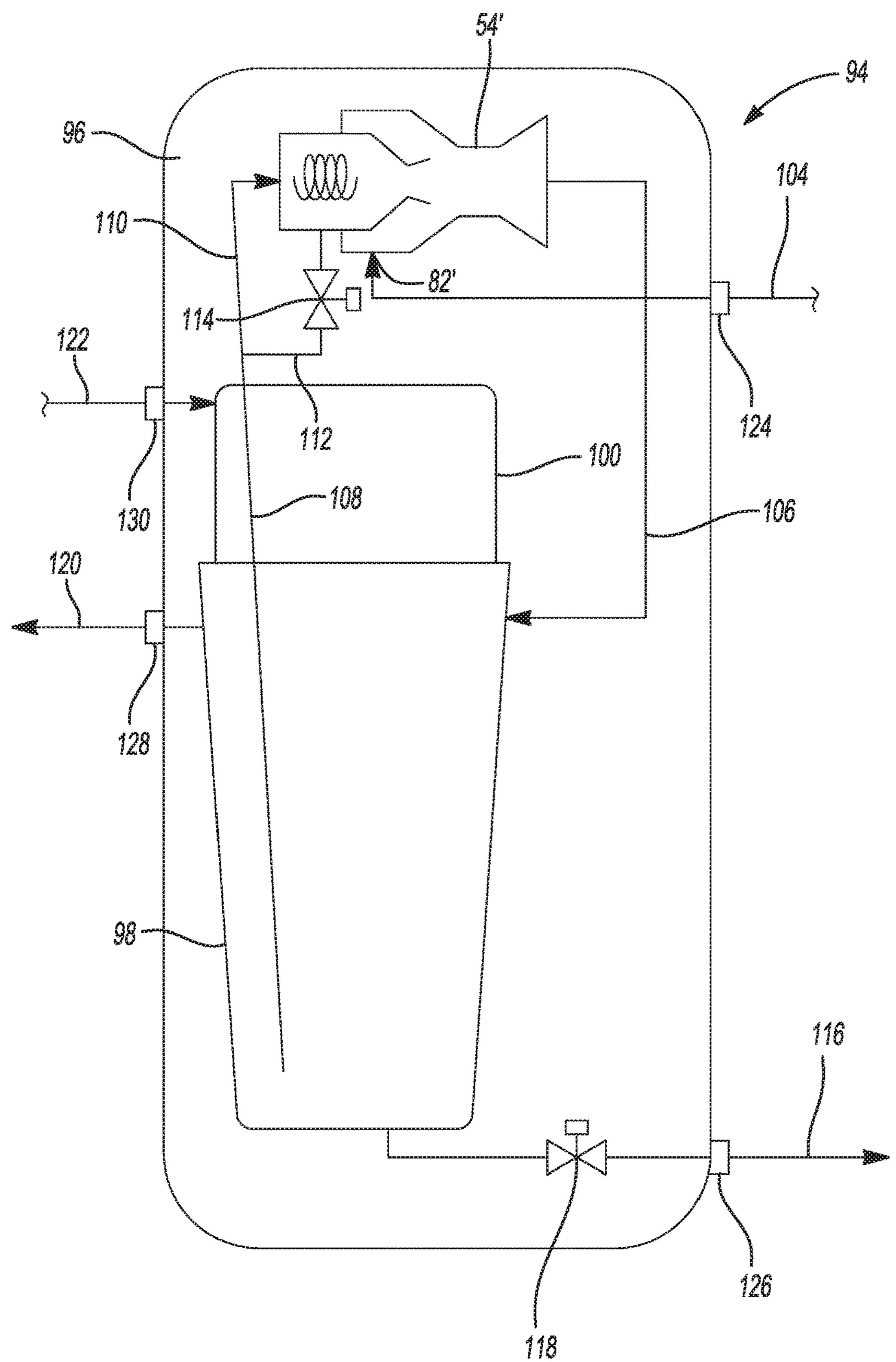
FIG. 4 is a diagrammatic view of an ejector-receiver having components incorporated into a single container according to a further embodiment.

Referring to FIG. 4 and again to FIGS. 2 and 3, in a further aspect, components of an ejector-receiver 94 are all incorporated into a single container 96 similar to the components of the ejector-receiver 44, but having different internal flow paths, different internal connections, and different external connections. The container 96 similar to the container 48 may take any desired geometric form, including cylindrical, rectangular, square, or oval. Included in the container 96 is a heat exchanger device 98 which houses a receiver and dryer 100. The container 96 also incorporates an ejector 54', similar to or modified from the ejector 54.

A refrigerant in the form of a cold gas is fed from the evaporator 46 shown in FIG. 2 via a cold gas inlet line 104 directly into the aspirated inlet post 82' of the ejector 54'. A discharge line 106 in communication with the ejector 54' directs a discharge from the ejector 54' into the heat exchanger device 98. The cold gas flows through a heat exchanger created within the heat exchanger device 98 through a cavity defined between the heat exchanger device 98 and an outer wall of the receiver and dryer 100 and then flows to the compressor via a gas outlet line 120. A portion of a flow in an ejector feed line 108 can also be bypassed in a bypass line 112 through a vortex control or electronically controlled throttling valve 114 to create a swirling flow in the ejector 54' as previously described in reference to FIG. 3.

Refrigerant in a liquid phase is discharged from the heat exchanger device 98 via a liquid refrigerant discharge line 116 into the evaporator 46 shown in FIG. 2 and is retained in liquid phase during transfer by throttling flow using a metering or electronically regulated throttling valve 118 positioned in the liquid refrigerant discharge line 116. Warmed low pressure refrigerant in a gas phase is discharged from the exchanger canister 98 via the gas outlet line 120 into an inlet side of the compressor 14' shown in FIG. 2. A condenser return line 122 directs refrigerant flow from the phase separation condenser 42 shown in FIG. 2 into the receiver and dryer 100. Connections 124, 126, 128, 130 may also be provided through a wall of the container 96 for each of the cold gas inlet line 104, the gas outlet line 120, the liquid refrigerant discharge line 116 and the condenser return line 122. Similar to the configuration described in reference to FIG. 3, it is noted the throttling valve 114 and the throttling valve 118 are shown and described in several aspects as being positioned within the container 96, however according to further aspects, either the throttling valve 114 or the throttling valve 118, or both valves can be positioned outside of the container 96 of the ejector-receiver 94.

An automobile vehicle refrigeration system combined ejector valve and receiver of the present disclosure offers several advantages. These include the inclusion of each of an ejector, a device defining a heat exchanger, and a receiver and dryer all within a single container. A refrigerant phase separator can also be included within the container to further improve efficiency. This provides a compact package of these components and their piping to integrate the components into an efficient ejector air conditioning circuit for a production vehicle. Inlet and outlet piping connection locations to the container can be maintained between different internal arrangement aspects of the receivers.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An automobile vehicle refrigeration system combined ejector-receiver, comprising:
- a container;
- an internal heat exchanger (IHX) device positioned within the container, the IHX device receiving a low pressure refrigerant;
- a receiver and dryer located within the container and positioned at least partially within the IHX device defining a cavity between the receiver and dryer and the IHX;
- an ejector having a chamber and an ejector discharge line positioned within the container;
- an ejector feed line positioned within the container and extending from the cavity into the ejector;
- a bypass line positioned within the container, the bypass line in communication with the ejector feed line and the ejector and bypassing flow around the ejector inlet line to enter the chamber of the ejector.

2. The automobile vehicle refrigeration system combined ejector-receiver of claim 1, wherein the IHX further includes an inner wall and wherein the receiver and dryer positioned within the container includes an outer wall having the cavity between the inner wall and the outer wall, the cavity receiving the refrigerant as a low pressure refrigerant gas fed from an evaporator positioned external to the ejector-receiver via a gas inlet line extending into the IHX.

3. The automobile vehicle refrigeration system combined ejector-receiver of claim 2, further including an aspirated feed line of the ejector positioned in the container providing communication for flow of the low pressure refrigerant gas between the IHX and an aspirated inlet post of the ejector.

4. The automobile vehicle refrigeration system combined ejector-receiver of claim 1, further including a refrigerant phase separator positioned within the container in communication with the ejector via the ejector discharge line within the container and receiving the refrigerant discharged from the ejector for separation into each of a refrigerant gas and a low pressure refrigerant liquid.

5. The automobile vehicle refrigeration system combined ejector-receiver of claim 4, wherein the refrigerant phase separator includes:
- a first connection extending through a wall of the container supporting a gas outlet line in communication with an inlet of a compressor positioned external to the container to transfer the refrigerant gas to the compressor; and
- a second connection extending through a wall of the container supporting a liquid discharge line transferring the low pressure refrigerant liquid to an evaporator positioned external to the container, the liquid discharge line having a throttling valve positioned within the container.

6. The automobile vehicle refrigeration system combined ejector-receiver of claim 1, further including:

a condenser outlet line directing flow of the refrigerant from a phase separation condenser positioned external to the container to flow into the receiver and dryer; and a receiver-dryer line positioned within the container in communication between the receiver-dryer and an ejector post of the ejector.

7. The automobile vehicle refrigeration system combined ejector-receiver of claim 6, further including a refrigerant phase separator positioned within the container, the refrigerant phase separator receiving the refrigerant discharged from the ejector.

8. The automobile vehicle refrigeration system combined ejector-receiver of claim 7, further including:

a discharge line in communication with the ejector directing a discharge from the ejector into a container of the IHX device; and a low pressure liquid discharge line in communication with the container directing the refrigerant in liquid phase discharged from the heat exchanger canister into an evaporator positioned external to the container, the liquid discharge line having a throttling valve.

9. The automobile vehicle refrigeration system combined ejector-receiver of claim 8, further including:

a gas outlet line extending from the container directing the refrigerant in a gas phase into an inlet of a compressor positioned external to the container; and a condenser return line directing flow of the refrigerant from a phase separation condenser positioned external to the container into the receiver and dryer.

10. An automobile vehicle refrigeration system combined ejector-receiver, comprising:

a container;

a heat exchanger device positioned within the container;

a receiver and dryer located entirely within the container and positioned at least partially within the heat exchanger device defining a cavity between the receiver and dryer and the heat exchanger device to receive a refrigerant;

an ejector having a chamber, the ejector positioned within the container in communication with the heat exchanger device, the ejector receiving the refrigerant after discharge from the receiver and dryer; and a refrigerant phase separator positioned within the container separating the refrigerant into each of a gas and a low pressure liquid;

an ejector feed line positioned within the container in communication with the cavity and extending from the cavity into the ejector;

a bypass line positioned within the container, the bypass line in communication with the ejector feed line and the ejector and bypassing flow around the ejector inlet line to enter the chamber of the ejector; and a throttling valve positioned in the bypass line operated to induce a swirl flow in the chamber of the ejector.

11. The automobile vehicle refrigeration system combined ejector-receiver of claim 10, further including a cold gas inlet line connected to the heat exchanger device, wherein the refrigerant as the gas is fed from an evaporator positioned external to the container into the cold gas inlet line.

12. The automobile vehicle refrigeration system combined ejector-receiver of claim 10, wherein the refrigerant phase separator is in communication with the ejector, the refrigerant phase separator receiving the refrigerant after discharge from the ejector.

13. The automobile vehicle refrigeration system combined ejector-receiver of claim 1, further including: a throttling valve positioned in the bypass line operated to induce a swirl flow in the chamber of the ejector.

14. The automobile vehicle refrigeration system combined ejector-receiver of claim 10, further including a discharge line in communication with the ejector directing a discharge of the refrigerant from the ejector into the heat exchanger device for flow into the refrigerant phase separator.

15. An automobile vehicle refrigeration system combined ejector-receiver, comprising:

a container;

an internal heat exchanger (IHX) positioned entirely within the container, the IHX including a canister;

a receiver and dryer located entirely within the container and positioned at least partially within the canister defining a cavity between the receiver and dryer and the canister of the IHX to receive a refrigerant;

an ejector having a chamber, the ejector positioned within the container;

an ejector feed line in communication with the cavity between the receiver and dryer and the canister of the IHX, the ejector feed line receiving the refrigerant after discharge from the receiver and dryer for flow into the ejector; and a refrigerant phase separator positioned within the container, the refrigerant phase separator receiving the refrigerant after discharge from the ejector for separation into each of a refrigerant gas and a low pressure refrigerant liquid;

a bypass line positioned within the container, the bypass line in communication with the ejector feed line and the ejector and bypassing flow around the ejector inlet line to enter the chamber of the ejector; and a throttling valve positioned in the bypass line operated to induce a swirl flow in the chamber of the ejector.

16. The automobile vehicle refrigeration system combined ejector-receiver of claim 15, further including:

a refrigerant gas outlet line in communication with the refrigerant phase separator to transfer the refrigerant gas outside of the container; and a refrigerant liquid discharge line in communication with the refrigerant phase separator to transfer the low pressure refrigerant liquid outside of the container, the refrigerant liquid discharge line having a throttling valve positioned within the container.

17. The automobile vehicle refrigeration system combined ejector-receiver of claim 15, further including a low pressure liquid refrigerant discharge line for transferring the low pressure refrigerant liquid out of the container, the low pressure refrigerant discharge line having an electronically regulated throttling valve positioned within the container.

* * * * *